(12) United States Patent
Consoli et al.

(10) Patent No.: US 7,180,262 B2
(45) Date of Patent: Feb. 20, 2007

(54) CONTROL SYSTEM AND METHOD FOR ELECTRIC DRIVES WITH A.C. MOTORS

(75) Inventors: Alfio Consoli, Catania (IT); Giuseppe Scarcella, Furci Sicula (IT); Antonio Testa, Acireale (IT)

(73) Assignee: Universita' Degli Studi Di Cantania, Cantania (IT)

( * ) Notice: Subject to any disclaimer, the term of this patent is extended or adjusted under 35 U.S.C. 154(b) by 0 days.

(21) Appl. No.: 11/154,368

(22) Filed: Jun. 16, 2005

(65) Prior Publication Data

US 2006/0091845 A1 May 4, 2006

(30) Foreign Application Priority Data

Jun. 16, 2004 (IT) .............................. TO04A0399

(51) Int. Cl.
H02P 6/08 (2006.01)
H02P 27/00 (2006.01)

(52) U.S. Cl. ....................... 318/705; 318/721; 318/700; 318/799; 318/805

(58) Field of Classification Search ..................... None
See application file for complete search history.

(56) References Cited

U.S. PATENT DOCUMENTS

| | | | |
|---|---|---|---|
| 6,388,420 B1 * | 5/2002 | Jansen et al. | 318/799 |
| 6,462,492 B1 * | 10/2002 | Sakamoto et al. | 318/254 |
| 6,552,509 B2 * | 4/2003 | Veltman | 318/807 |
| 6,639,380 B2 * | 10/2003 | Sul et al. | 318/727 |
| 6,825,646 B2 * | 11/2004 | Colombo | 318/437 |
| 6,984,270 B2 * | 1/2006 | Sato et al. | 148/101 |

* cited by examiner

Primary Examiner—Lincoln Donovan
Assistant Examiner—Eduardo Colon Santana
(74) Attorney, Agent, or Firm—Merchant & Gould P.C.

(57) ABSTRACT

A vector-control system and method of a "sensorless" type for electric drives with a.c. motors is based upon generation of an oscillating magnetic field and upon measurement of the deviation, with respect to said oscillating field, of the flux generated thereby on account of anisotropy, whether natural or induced, of the magnetic structure of the machine.

13 Claims, 2 Drawing Sheets

CONTROL SYSTEM AND METHOD FOR ELECTRIC DRIVES WITH A.C. MOTORS

BACKGROUND OF THE INVENTION

1. Field of the Invention

Forming the subject of the present invention are a control system and a control method for "sensorless" drives with a.c. motors.

Currently, vector-controlled electric drives with a.c. motors are widely used in various industrial applications, in machine tools, pumps, conveyor belts, and the like, where they are progressively supplanting traditional d.c. electric drives, thanks also to their greater sturdiness, their reduced maintenance requirements, and their lower production costs.

2. Description of the Prior Art

The principle of vector control is based on the independent regulation of the components of the stator-current vector defined with respect to a reference system synchronous with the rotor flux. The instantaneous position of the rotor flux, which is necessary for vector control, can be measured directly using Hall-effect flux sensors or, in the case of synchronous machines, by measuring the position of the rotor by means of electro-optical or magneto-electric position sensors. Installation of said sensors causes an increase in the overall dimensions of the drive, renders necessary supplementary wiring and contributes considerably to increasing the cost of the drive. Furthermore, in particular operating conditions, the delicacy of such sensors can adversely affect the reliability of the drive.

The disadvantages linked to installation of the aforesaid sensors have been an impulse to the development of a series of vector-control techniques, referred to as "sensorless" techniques, which are able to reconstruct the position of the rotor flux without using a position transducer.

The above vector-control techniques are based upon different principles. In simpler sensorless vector-control techniques, said reconstruction is obtained by measuring the induced electromotive force. The techniques based upon said principle can be implemented simply and at a low cost; however, they do not function at low or zero rotor speeds.

More sophisticated techniques of a sensorless type are based upon injection of appropriate reference signals and upon measurement of current and/or voltage harmonics. Said techniques enable a considerable reduction in the minimum speed enabled by the control. However, they also prove extremely expensive in terms of computing power required and/or in terms of processing times and, in many cases, do not provide a complete solution to the problem of vector control of a.c. electric machines at very low or zero speeds.

Control of a drive at a very low or zero speed is required in many applications of electric drives in the industrial framework and in the transport field and, in particular, in electric-driven means, in robotics and in many new-generation machine tools.

SUMMARY OF THE INVENTION

A purpose of the present invention is to provide a sensorless vector-control system for electric drives with a.c. motors, which will overcome the drawbacks mentioned above and, in particular, to provide a sensorless control technique capable of operating properly at very low or even zero speeds.

Another purpose of the present invention is to provide a sensorless vector-control system for electric drives with a.c. motors and to suggest a constructional scheme thereof, which makes use of traditional circuits and components that are simple to install and use, at relatively contained costs as compared to known techniques, by virtue of the advantages achieved.

The above purposes, according to the present invention, are achieved by providing a sensorless vector-control system for electric drives with a.c. machines according to claim 1 and a corresponding control method according to claim 2, to which the reader is referred for reasons of brevity.

Advantageously, the technique proposed is based upon the generation of a field oscillating at a fixed frequency, by means of injection of an appropriate test signal, and upon evaluation of the phase difference between said oscillating field and the flux generated thereby. Said phase difference is generated by the anisotropy proper to the magnetic structure of many electric machines (so-called anisotropic electric machines) or else, in the case of isotropic machines, by the anisotropy generated in normal operating conditions by the saturation of the ferromagnetic core.

The anisotropy proper to the ferromagnetic core of synchronous electric machines with reluctance or of synchronous electric machines with external permanent magnets is a characteristic directly linked to the geometry of the rotor. By detecting the effects of anisotropy in different directions, according to a reference system synchronous with the stator, it is consequently possible to determine the position of the rotor. The induced anisotropy is instead caused, in isotropic synchronous machines and in asynchronous machines, by the presence of the main magnetic field. In this case, by detecting the effects of the anisotropy in different directions, according to a reference system synchronous with the stator, it is possible to determine the position of the main magnetic field. The position of the main magnetic field in practice coincides with the position of the rotor in synchronous machines with external permanent magnets, which have a very contained armature reaction, and with the position of the gap flux in asynchronous machines.

As compared with other sensorless techniques based upon the injection of test signals, and in particular of high-frequency signals, the technique proposed is more robust, does not require installation of further current and voltage sensors and can be in theory used on all a.c. electric machines, whether anisotropic ones or isotropic ones, provided, however, that in the latter case the intensity of the main flux is able to saturate the ferromagnetic core.

BRIEF DESCRIPTION OF THE DRAWING

Further characteristics and advantages of a system and method for sensorless vector control of electric drives with a.c. machines made according to the invention will emerge more clearly evident from the ensuing description, regarding a preferred embodiment, provided by way of non-limiting example, with reference to the attached schematic drawings, in which.

DETAILED DESCRIPTION OF THE PREFERRED EMBODIMENT

Figure 3:
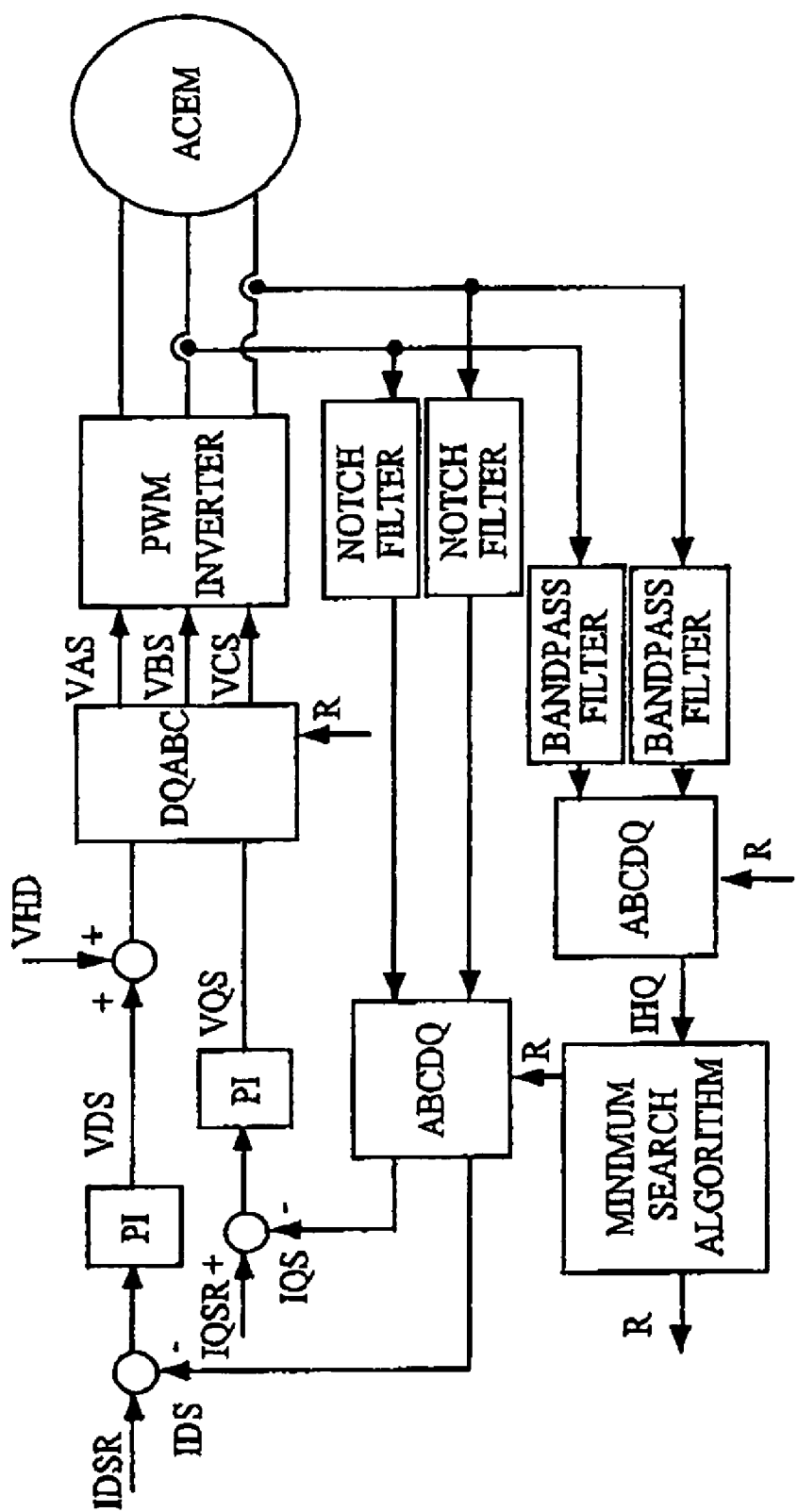
FIG. 3 is a block diagram of a control system for electric drives with a.c. machines, according to the present invention.

The control method according to the invention is suited to a simple and economic experimental implementation such as the one illustrated in the block diagram of FIG. 3, which represents an exemplifying, but non-limiting, embodiment of the system according to the invention. Present in said figure are three blocks that perform a transformation of reference axes, and in particular two blocks of the type ABCDQ, which enable passage from the fixed reference system ABC to the rotating system DQ, and a block DQABC, which performs the reverse operation. Further present are two regulation blocks PI, which process the current error and generate the signals VDS, VQS, which are then transformed into the references VAS, VBS and VCS of the PWM INVERTER that supplies the a.c. electric machine ACEM.

Figure 1:
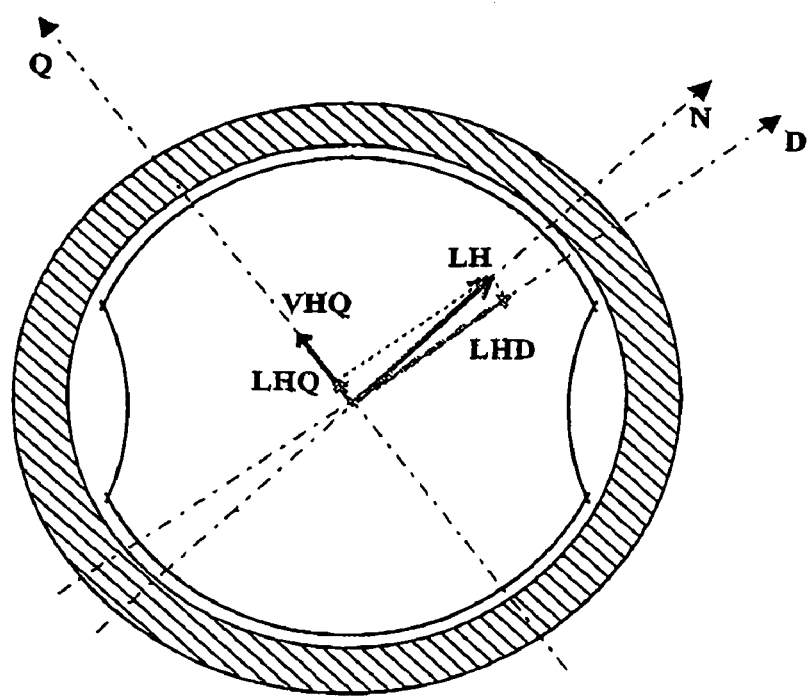
FIG. 1 is a schematic illustration of the ferromagnetic core of an a.c. machine and represents the relative positions of the components of flux produced by the purposely generated oscillating field.
Figure 2:
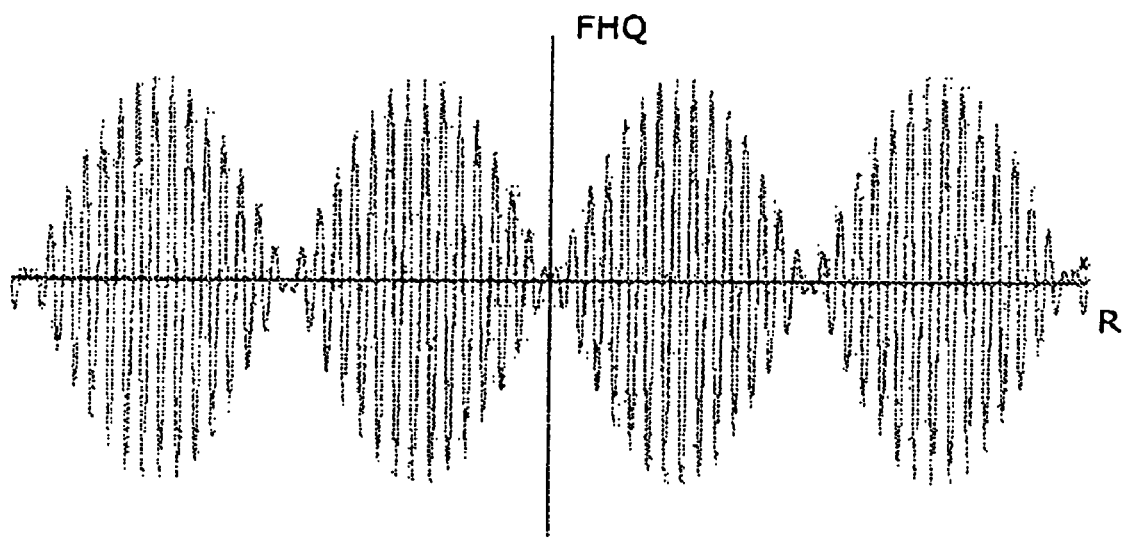
FIG. 2 shows the graph of the amplitude of the flux in quadrature with respect to the oscillating field as a function of the position of the rotor in an anisotropic synchronous machine.

With reference to the above figures, VHQ designates the voltage induced by the flux component LHQ. Said flux component is, in turn, generated by the additional oscillating field FH, is orthogonal to the latter, and arises on account of the anisotropy of the ferromagnetic core. In a theoretical case of a completely isotropic system, in fact, only the flux component LHD, parallel to the oscillating field FH, would be present. In fact, as has already been pointed out, a.c. motors present a magnetic anisotropy, which in anisotropic machines is due to the very conformation of the rotor and in isotropic machines to the local saturation induced by the main magnetic field. As a consequence of this, a rotating or oscillating field, obtained by injecting appropriate voltage or current signals in the stator of the machine, generates a flux that is deviated, with respect to the field itself, by an angle that depends upon the position N of the field with respect to a reference system synchronous with the rotor of the machine. Consequently, as shown in FIG. 1, the flux will be made up of a component parallel to the field LHD and a component orthogonal to the field LHQ. The behaviour of the component LHQ is a function of N, which is the angular position of the oscillating field with respect to the rotor, as shown in FIG. 2.

The flux component LHQ orthogonal to the field induces in the stator a voltage component VHQ, which can be detected directly and the pattern of which enables determination of the position of the rotor at a given instant. The pattern of the voltage VHQ can also be detected indirectly by measuring the current IHQ generated by said voltage component in the stator windings of the machine. In the latter case, there is obtained the advantage of being able to use for the measurement the same current sensors already present in any vector-controlled a.c. drive, instead of resorting to two supplementary voltage sensors.

In order to acquire the voltage VHQ from the measurement of the current IHQ indirectly, it is in any case indispensable to perform a total decoupling between the current-control loop and the system for estimation of the rotor position. Since the low-speed current-control loop acts on low-frequency components of the stator current, whilst the position-estimation system acts on harmonic components at a higher frequency, the decoupling can be obtained by means of a double set of filters. In particular, two filters of a notch type eliminate the current components generated by the additional oscillating field from the reaction signals used for the current control IDS and IQS, whilst two bandpass filters separate the current component generated by the additional oscillating field IHQ from the rest of the harmonic content of the current signal measured in order to supply them to the system that calculates the position of the rotor.

Since the synchronous machine is supplied via an electronic circuit PWM INVERTER capable of regulating the voltages and the stator currents, the additional oscillating field FH can be generated simply by adding to the normal reference signals VDS and VQS, synthesized by the current control, an oscillating voltage component VHD. Alternatively, it is possible to add an oscillating current component IHD to the references of the current control IDSR and IQSR.

The components of the stator current IS generated by injection of the oscillating signal of voltage VHD (or else of current IHD) are eliminated by means of a filtering element NOTCH FILTER from the signal used for the current-control loop so as to decouple the current-control circuit from the system that carries out estimation of the position R of the rotor. A second filtering element BANDPASS FILTER further enables separation of the voltage and current harmonics generated the injection of the oscillating signal of voltage VHD (or else of current IHD) from the rest of the harmonic content of the voltage and/or stator current in order to enable a correct processing thereof in the block MINIMUM SEARCH ALGORITHM, which determines the position of the rotor.

Determination of the position of the rotor can be carried out via tracking, i.e., by forcing the motor to track a condition in which the voltage VHQ (or else the current IHQ), orthogonal to the oscillating field, is minimum. Alternatively, it is also possible to determine analytically the position of the rotor from the amplitude of the voltage VHQ (or else of the current IHQ).

From the foregoing description, the characteristics of the control system and method for electric drives with a.c. motors, which form the subject of the present invention, appear clearly evident, as likewise the advantages thereof.

In addition, it is evident that numerous variations can be made to the control system according to the present invention, without thereby departing from the principles of novelty inherent in the inventive idea, as likewise it is clear that, in the practical implementation of the invention, the materials, shapes and dimensions of the items illustrated may be any whatsoever according to the requirements, and said items may be replaced with other technically equivalent ones.

What is claimed is:

1. A sensorless vector-control system for electric drives, comprising means for determining the position of a rotor and/or a rotor flux or of a main magnetic field of a synchronous electric machine using an oscillating magnetic field, starting from a phase difference between said oscillating magnetic field and flux generated thereby, said phase difference between said oscillating magnetic field and the flux being produced by anisotropy, whether natural or induced, of the magnetic structure of the electric drive or electric machine, wherein an additional oscillating magnetic field is generated by adding an oscillating voltage component to voltage reference signals, synthesized by a current-control loop on a three phase stator voltage of said electric machine.

2. The control system of claim 1, wherein said oscillating magnetic field is at a fixed frequency and is generated by means of injection of a pre-set test signal.

3. The control system of claim 2, comprising at least one first signal-filtering element, used for the current-control loop and designed to eliminate the components of the stator current generated by injection of said test signal, decoupling the current-control circuit from the system that carries out an estimation of the position of the rotor.

4. The control system of claim 2, comprising at least one second element for signal bandpass filtering, which enables separation of the voltage and current harmonics generated by the injection of said test signal from the rest of the harmonic content of the voltage and/or stator current in order to enable a correct processing thereof in a computing block, which determines the position the rotor.

5. The control system of claim 1, wherein said position of the rotor and/or of the rotor flux or of the main magnetic field is determined by detecting the effects of anisotropy in different directions, according to a reference system synchronous with a stator of said electric drives or electric machines.

6. The control system of claim 1, wherein said electric machine is a synchronous type with reluctance or of the synchronous type with external permanent magnets and/or of the isotropic or anisotropic synchronous type, or an asynchronous type.

7. The control system of claim 1, wherein, in the synchronous electric machine supplied via an electronic circuit, said additional oscillating magnetic field is generated by adding to the reference signals of the current-control loop an oscillating current component.

8. The control system of claim 7, comprising: a plurality of blocks designed to provide a transformation of reference axes from a fixed system to a rotating system and vice versa; and a series of regulation blocks, which process a current-error signal and generate said voltage reference signals, which are then transformed into further references, via at least one of said blocks of transformation of the reference axes, and are sent to said electronic circuit, which supplies the a.c. electric machine.

9. A control method implemented on a sensorless vector-control system for electric drives, comprising means for determining the position of a rotor and/or of a rotor flux or of a main magnetic field of a synchronous electric machine using an oscillating magnetic field, starting from a phase difference between said oscillating magnetic field and flux generated thereby, said phase difference between said oscillating magnetic field and the flux being produced by anisotropy, whether natural or induced, of the magnetic structure of the electric drive or electric machine, comprising at least one of the following steps:

superimposing an oscillating single-phase voltage component on three-phase stator voltage of the electric machine to generate an additional oscillating magnetic field rotating at the speed of the rotor flux, which in turn generates an oscillating flux rotating at the speed of the rotor flux and out of phase with respect to said oscillating magnetic field by an angle that is a function of the relative position between said single-phase voltage component and magnetic-induction flux of the rotor; and injecting a single-phase oscillating current component to three-phase stator current of the electric machine to generate an additional oscillating magnetic field rotating at the speed of the rotor flux, which in turn generates an oscillating flux rotating at the speed of the rotor flux and out of phase with respect to said oscillating magnetic field by an angle that is a function of the relative position between said single-phase current component and magnetic-induction flux of the rotor.

10. The control method of claim 9, wherein the oscillating single-phase voltage component is a low frequency component.

11. The control method of claim 9, wherein the oscillating single-phase current component is a low frequency component.

12. The control method of claim 9, further comprising tracking a minimum value of a phase difference between the oscillating flux and the oscillating magnetic field generated by the superposition of an oscillating single-phase voltage.

13. The control method of claim 9, further comprising tracking a minimum value of a phase difference between the oscillating flux and the oscillating magnetic field generated by the superposition of an oscillating single-phase current.

* * * * *